United States Patent [19]
Takagi et al.

[11] Patent Number: 5,177,599
[45] Date of Patent: Jan. 5, 1993

[54] WHITE BALANCE CONTROLLER FOR AN IMAGE PICK-UP APPARATUS INCLUDING AN ABNORMALITY DETECTOR

[75] Inventors: Yasushi Takagi; Takuya Imaide, both of Yokohama, Japan

[73] Assignee: Hitachi, Ltd., Tokyo, Japan

[21] Appl. No.: 731,531

[22] Filed: Jul. 17, 1991

Related U.S. Application Data

[63] Continuation-in-part of Ser. No. 642,538, Jan. 17, 1991.

[30] Foreign Application Priority Data

Jul. 23, 1990 [JP] Japan .................................. 2-193010

[51] Int. Cl.⁵ .............................................. H04N 9/73
[52] U.S. Cl. .......................................... 358/29; 358/41
[58] Field of Search ................. 358/29 C, 41, 44, 221, 358/213.16, 228, 37

[56] References Cited

U.S. PATENT DOCUMENTS 4,739,393  4/1988  Seki et al. ..................... 358/29 C
4,750,032  6/1988  Nakayama ..................... 358/29 C
4,883,360  11/1989  Kawada et al. .................. 358/29 C Primary Examiner—Edward L. Coles, Sr.
Assistant Examiner—Kim Yen Vu
Attorney, Agent, or Firm—Antonelli, Terry, Stout & Kraus

[57] ABSTRACT

A white balance controller for an image pickup apparatus having an image pickup for providing an output indicative of an image, a color separator responsive to the output of the image pickup for producing a luminance signal and a plurality of color signals therefrom, gain controllers for controlling a gain of at least two color signals of the plurality of color signals separated by the color separator, and a color difference signal generator for generating color difference signals from at least one of a color signal and luminance signal. The white balance controller includes white/achromatic detection for detecting at least one of a white and achromatic portion within an image picked up by the image pickup in accordance with a least the color difference signals, and an abnormality detector for detecting an abnormality of white balance within the picked up image. The abnormality detector supplies an output thereof to an input of the white/achromatic detector and enables control of a gain of the gain controllers in accordance therewith for enabling white adjustment.

14 Claims, 4 Drawing Sheets

WHITE BALANCE CONTROLLER FOR AN IMAGE PICK-UP APPARATUS INCLUDING AN ABNORMALITY DETECTOR

CROSS-REFERENCE TO RELATED APPLICATION

This application is a Continuation-in-Part application of U.S. application Ser. No. 642,538, filed Jan. 17, 1991, the subject matter of which is incorporated by reference herein.

BACKGROUND OF THE INVENTION

The present invention relates to a white balance controller for an image pickup apparatus such as a video camera and, more particularly, to a white balance controller for performing a stabilized white balance controlling function under light sources whose color temperature changes.

Conventional apparatus of the described type, as disclosed in Japanese Laid-open Patent Publication No. 63-219291 corresponding to U.S. Pat. No. 4,797,733, enable white extraction treatment using a fixed threshold value to the amplitude of the color difference signals (or the signals used for calculating the color difference signals) after effecting white balance adjustment.

In the above described prior art, attention was only paid to the saturation of a colored portion in a state having white balance achieved, and no consideration was given to the condition of the color temperature of the lighting.

Further, in the above described prior art, not much attention was given to the automatic exposure control characteristic against the white ratio of the picture or the sensitivity of the image pickup element, and in view thereof the detection level sometimes became improper depending on the object of the viewing or the lighting.

SUMMARY OF THE INVENTION

It is therefore an object of the present invention is to provide a white balance controller for establishing a suitable range for white extraction by combining information about saturation of an object and the color temperature of lighting, or the state of adjusted white balance.

If is another object of the present invention to achieve an accurate white extraction at all times corresponding to changes in viewing conditions of the object imaged.

In accordance with a feature of the present invention, the range (hue, saturation) to be accepted as white is rendered adaptive to the color temperature of lighting or the controlled state of white balance.

According to another feature of the present invention, the range (density, brightness) to be accepted as white is rendered adaptive to luminance distribution over the imaged object or the like.

When the white extraction range is determined with respect to the initial state of achieved white balance, the range of saturation to be accepted as white is fixed at all times, but if a change in the color temperature for white or the like is taken into consideration, the range will change depending on the adjusted state or white balance. For example, when the color temperature up to 10000° K. is established to be accepted as white with the initial state set at 5000° K., if white balance is achieved at 8000° K., then even 20000° K. will be accepted as white, and, conversely, the extraction range on the lower color temperature side will become narrower. In view of this, the present invention enables shifting of the white extraction range according to the adjusted state of white balance. More specifically, when white balance is achieved at a higher color temperature, for example, control is exercised such that the white extraction range is expanded in the direction of red (positive direction along the R−B axis) and the white extraction range is compressed in the direction of blue (negative direction along the R−B axis).

Conversely, when white balance is achieved at a lower color temperature, control is exercised such that the white extraction range is compressed in the direction of red (positive direction along the R−B axis) and the white extraction range is expanded in the direction of blue (negative direction along the R−B axis).

With the described arrangement, the range of color temperature as the object of white extraction can be rendered adaptive to the color temperature of lighting (adjusted state of white balance) at the time of imaging or shooting. Therefore, it becomes possible to achieve more stabilized and stricter white extraction.

Generally speaking, the white portion of an object has higher reflectivity than the chromatic portion. Therefore, when there appears a mixed white portion and a colored portion, the portion having relatively high luminance can be accepted as white. Hence, average luminance for the entire picture is used as the threshold value and white is extracted for the portion having higher luminance than the threshold value. Thus, detection of "relatively" high luminance becomes possible, and accordingly, stabilized detection can achieved even when luminance is varying on the entire picture, or specified luminance is not obtained due to insufficient lighting, or the like.

These and further objects, features and advantages of the present invention will become more obvious from the following description when taken in connection with the accompanying drawings which show for purposes of illustration only, several embodiments in accordance with the present invention.

DESCRIPTION OF THE PREFERRED EMBODIMENTS

Figure 1:
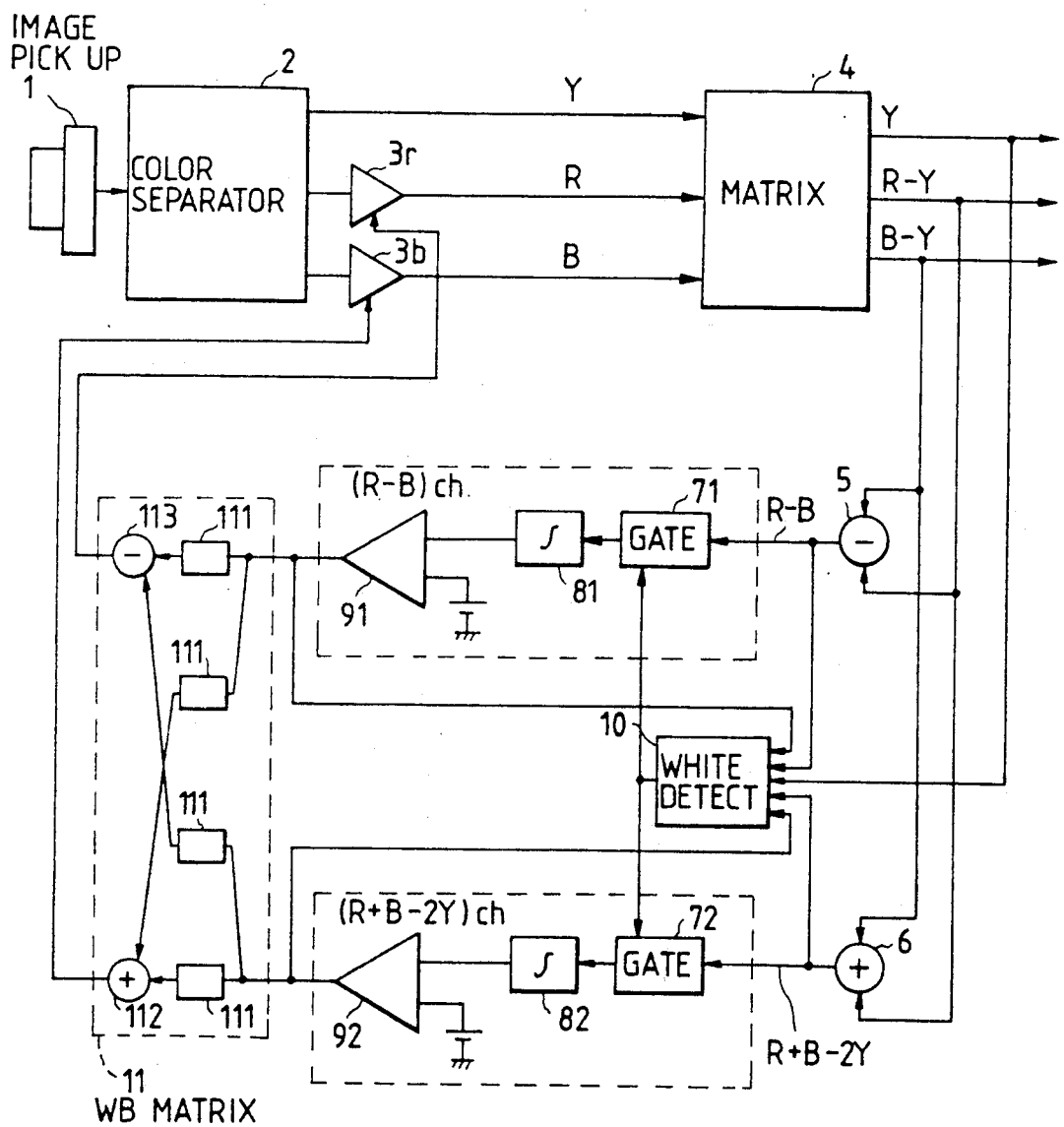
FIG. 1 is a block diagram showing an embodiment of the present invention.

An embodiment of the present invention will be described below with reference to FIG. 1. A color separator 2 produces a luminance signal and color signals from a signal emitted from an image pickup element 1. A red (R) signal and blue (B) signal are passed through gain control circuits 3r and 3b and combined with the luminance (Y) signal in a matrix circuit 4 so that color difference signals (R−Y, B−Y) are generated. The thus generated luminance (Y) signal and color difference signals (R−Y, B−Y) are partly output and partly input to a white balance control system. The control system detects a white and/or achromatic portion within the imaged picture utilizing the luminance and color difference signals and generates signals for adjusting the white balance and supplies the signals to the gain control circuits 3r and 3b in the R and B signal paths.

The color difference signals (R−Y, B−Y) taken out of the camera signal processing system are subjected to subtraction by a subtractor 5 and addition by an adder 6, whereby a detection signal R−B of color-temperature change and saturation in the R−B direction and a detection signal R+B−2Y of saturation in the Mg−G direction are generated. From these two signals (R−B, R+B−2Y), only signals for the white portion are extracted in gate circuits 71 and 72 and the extracted signals are subjected to integration by integrators 81 and 82 to be averaged for the entire picture, and according to the averaged white portion signal R−B (R+B−2Y), which corresponds to the color tone of the imaged picture (deviation from the white-balance state), white balance control signals are generated in comparator-amplifiers 91 and 92. The reference voltage for comparison input to the other input of the comparator-amplifier 91, 92 is a signal corresponding to the white portion average signal R−B (R+B−2Y) in the white-balanced state. The control signal in the direction along the R−B axis output from the amplifier 91 and the control signal in the direction along the R+B−2Y axis output from the amplifier 92 are converted, in the present embodiment, into signals for controlling the gains of the red (R) and the blue (B) signals of the circuits 3r and 3b, respectively, in the WB (white balance) matrix 11 whereby the white balance is adjusted. The WB matrix includes weighing resistors 111, an adder 112 and a subtractor 113 connected as shown.

Figure 2:
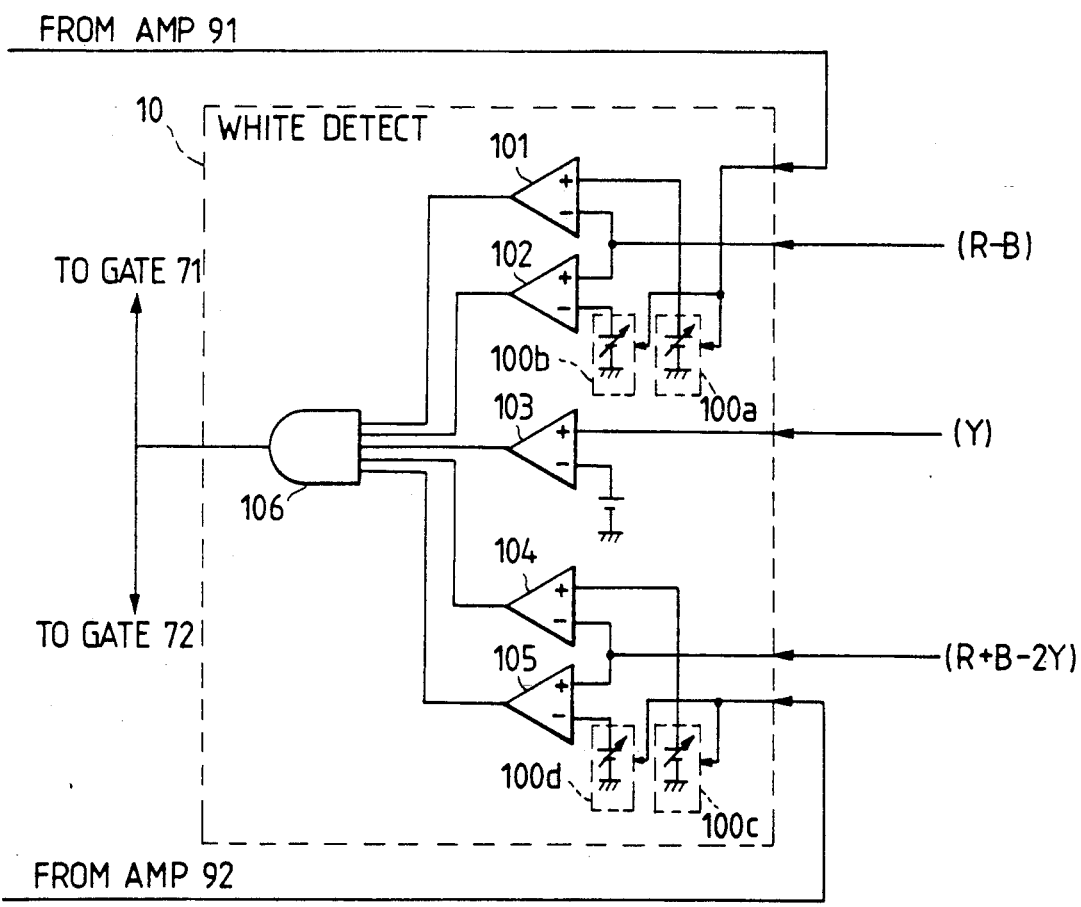
FIG. 2 is a block diagram of the white detector of FIG. 1.

A white and/or achromatic detection circuit 10, hereinafter referred to as the white detector circuit or white detector, is provided for driving the gate circuits 71 and 72 for white portion extraction and detects a low-saturation and high-luminance portion from the two saturation detection signals (R−B, R−B−2Y) of the subtractor 5, the adder 6, and the luminance signal (Y). The white detection circuit 10 is illustrated in FIG. 2 and includes variable voltage sources 100a–100d, amplifiers 101–105 and AND gate 106. As shown, the output of the amplifier 91 which is fed back to the white detector 10 serves for controlling the variable voltage sources 100a and 100b utilized as comparison inputs for amplifiers 101 and 102 and enable control of the detection range in one direction. In a similar manner, the output of the amplifier 92 is fed back to the white detector 10 for controlling the variable voltage sources 100c and 100d to enable control of the detection range in another direction. The variable voltage sources generally have the relationship of 100b<100a and 100d<100c.

Figure 3:
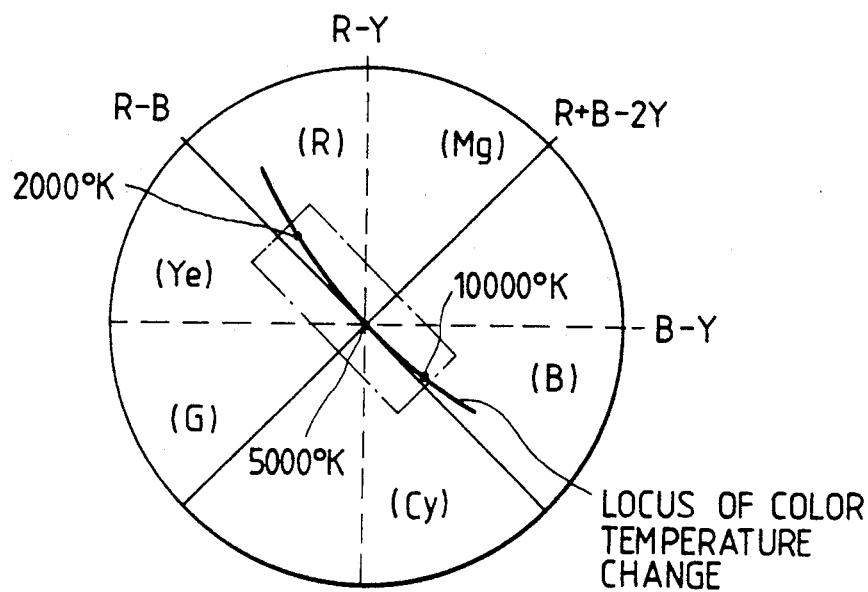
FIGS. 3 and 4 are diagrams explaining operations of the white balance controller shown in FIG. 1.

The locus of the changing color temperature on account of black body radiation (changing color quality of natural light) is drawn in the position on the color difference plane as shown in FIG. 3 with the relationship with the R−B axis and R+B−2Y axis also being indicated. More specifically, deviation from white (the intersection of the R−Y axis and the B−Y axis) due to a change in color temperature of the light source is determined according to R−B, and deviation from white for reasons other than the change in color temperature is determined by R+B−2Y. Then, in order to establish the range of white extraction (accepted as white) such that correction for at least a practical color temperature range (from 2000° K. to 10000° K., for example) is possible, the portion enclosed by the dot-dash line in the diagram is defined to be the white extraction range, by having the white-coloring on account of color temperature within the above range represented in terms of saturation (initial state).

If the color temperature of the lighting is changed from the initial state, the saturation corresponding to the change down to 2000° K. (or, up to 10000° K.) is accepted as white under the condition established as described above, and white balance control is exercised such that the white portion may meet the condition R−B=0 (R+B−2Y=0). At this time, since the white balance control signal (for example, the output of the amplifier 91) changes as the color temperature of the lighting changes, the color temperature at that time can be estimated from the control signal generated after the white balance has been achieved. In the case where the practical color temperature range is limited as described above, if the camera is balanced for white at 2000° K., for example, it can be assumed that the color temperature at the portion does not become lower than that. Under such condition, any signal having its amplitude in the direction of red can be considered to be a chromatic color. That is, the boundary of the white extraction range on the side of red under low color temperature may be shifted toward the side of lower saturation than the above described setting in the initial state in accordance with the output of amplifier 91. By contrast, the boundary on the side of blue may be required to be expanded, or shifted to the side of higher saturation.

Figure 4:
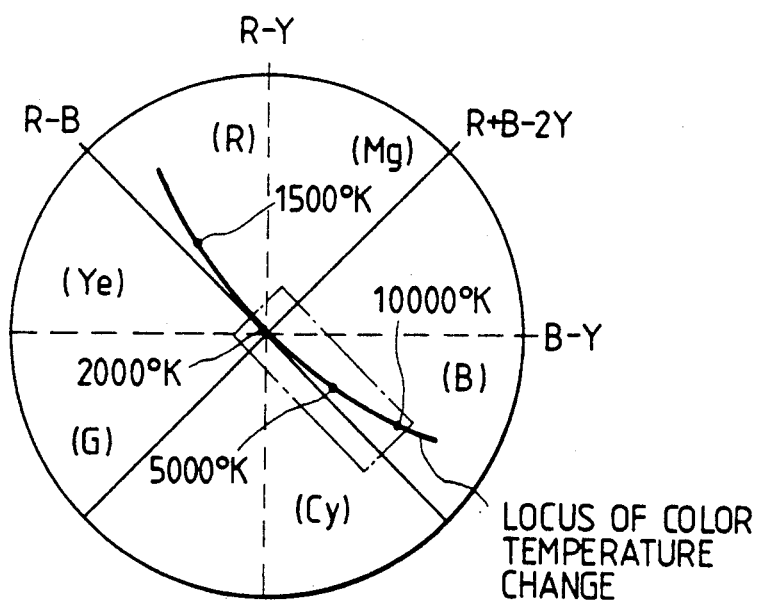

FIG. 4 is a diagram showing the white extraction range (dot-dash line) in imaging or shooting under such low color temperature. By changing the saturation level to be accepted as white at any time according to the white balance control signal (state of control) as described above, an advantage is obtained that an appropriate white extraction range can be established at all times. Although the present embodiment has been described above only with respect to control in the direction along which the color temperature changes, an improved effect can be obtained if similar control is exercised also in Mg-G direction (along R+B−2Y axis) in accordance with the output of amplifier 92.

Figure 5:
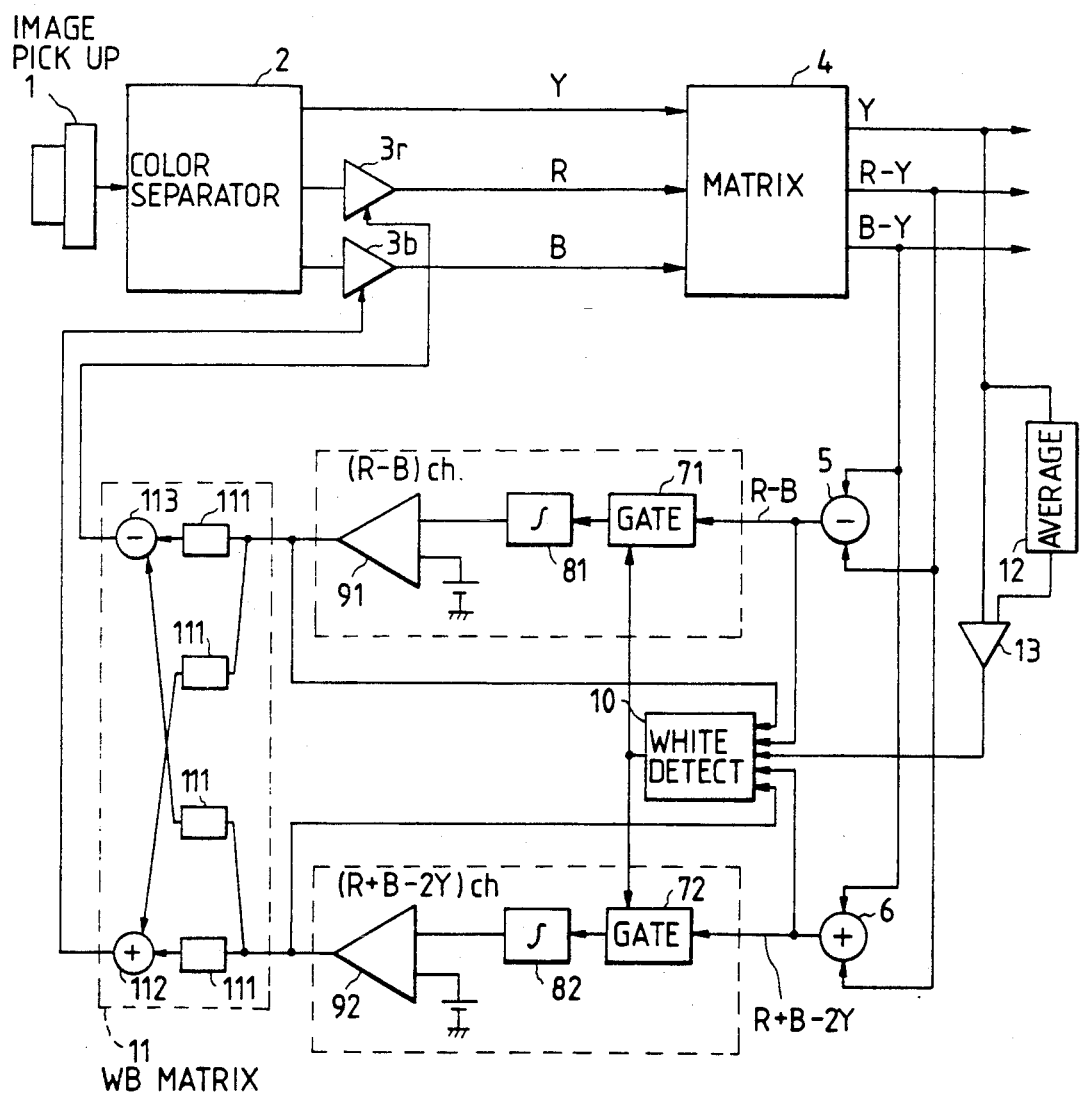
FIG. 5 is a block diagram showing another embodiment of the present invention.

FIG. 5 illustrates another embodiment of the present invention which utilizes the luminance signal (Y) in white extraction. The structure of the embodiment of FIG. 5 is similar to FIG. 1, but additionally is provided with an averaging circuit 12 and comparator 13. In the white extraction, the operation is similar to the operation of FIG. 1 such that the portion of low saturation and high luminance is accepted as white and the signal at such portion is extracted. However, if the luminance level to be accepted as white is fixed, sometimes execution of appropriate white extraction is not possible because the luminance level at the chromatic portion is raised, depending on the ratio between the white portion and the chromatic portion, by action of the automatic exposure controller or the like, or, conversely, the luminance level of the entire picture is lowered when illuminance is insufficient. In FIG. 5, the luminance (Y) signal extracted from the signal system is compared with an average value generated by an averaging circuit 12 in a comparator 13, and the white extraction is performed in accordance with the result of the comparison. Thereby, even when the imaging condition is varied as described above, a stabilized white extraction can be attained with the condition of "relatively" high luminance. Although the reference value for comparison is generated by averaging in the present embodiment, in place of such an averaging device, a device for generating a value in accordance with a luminance distribution such as a value at 80% of the peak luminance as the reference value is utilized to thereby have the portion close to the maximum value of the luminance to be detected.

In order to perform the above described controlling operation accurately, substantially precise signal control becomes necessary. This can be easily achieved by adopting digital signal processing, for example, and using some software.

According to the present invention, white extraction is performed in accordance with the saturation level adapted to the state of white balance, which depends on the color temperature, the kind of lighting, etc. at each time of shooting or imaging, and with the luminance level adapted to the state of exposure, which depends on the illuminance, the proportion of light (white) color, etc. Therefore, advantages of capability of stabilized white balance controlling and reduction of malfunctioning under varying imaging conditions can be obtained.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A white balance controller for an image pickup apparatus having image pickup means for providing an output indicative of an image, color separation means responsive to the output of the image pickup means for producing a luminance signal and a plurality of color signals therefrom, gain control means for controlling a gain of at least two color signals of the plurality of color signals separated by the color separation means, and means for generating color difference signals from at least one of a color signal and luminance signal, the white balance controller comprising:
   means for detecting an abnormality of white balance within an image picked up by the image pickup means, the abnormality detecting means supplying an output thereof to an input of a white/achromatic detecting means and for controlling a gain of the gain control means in accordance therewith for enabling white adjustment;
   the white/achromatic detecting means being responsive to the color difference signals and the output of the abnormality detecting means for detecting at least one of a white and achromatic portion within the picked up image in accordance with at least the color difference signals.

2. A white balance controller according to claim 1, wherein the color separation means provides a red (R), blue (B) and luminance (Y) signal, and the color difference signal generating means provides a Y, R−Y, and B−Y signal.

3. A white balance controller according to claim 2, wherein the abnormality detecting means includes means for supplying an output indicative of a color difference signal of R+B−2Y to an input of the white/achromatic detecting means for enabling control of the operation range in a second direction.

4. A white balance controller for an image pickup apparatus having image pickup means for providing an output indicative of an image, color separation means responsive to the output of the image pickup means for producing a luminance signal and a plurality of color signals therefrom, gain control means for controlling a gain of at least two color signals of the plurality of color signals separated by the color separation means, and means for generating color difference signals from at least one of a color signal and luminance signal, the white balance controller comprising:
   white/achromatic detecting means for detecting at least one of a white and achromatic portion within an image picked up by the image pickup means in accordance with at least the color difference signals;
   means for detecting an abnormality of white balance within the picked up image, the abnormality detecting means supplying an output thereof to an input of the white/achromatic detecting means and for controlling a gain of the gain control means in accordance therewith for enabling white adjustment; and
   means for changing an operating range of the white/achromatic detecting means so that the white/achromatic detecting means detects the white portion as white in accordance with a color temperature of lighting utilized for imaging.

5. A white balance controller according to claim 2, wherein the abnormality detecting means detects the color temperature of lighting utilized for imaging and includes means for utilizing gain controlling quantities of a color signal at the time of white adjustment.

6. A white balance controller for an image pickup apparatus having image pickup means for providing an output indicative of an image, color separation means responsive to the output of the image pickup means for producing a luminance signal and a plurality of color signals therefrom, gain control means for controlling a gain of at least two color signals of the plurality of color signals separated by the color separation means, and means for generating color difference signals from at least one of a color signal and luminance signal, the white balance controller comprising:
   white/achromatic detecting means for detecting at least one of a white and achromatic portion within an image picked up by the image pickup means in accordance with at least the color difference signals; and
   means for detecting an abnormality of white balance within the picked up image, the abnormality detecting means supplying an output thereof to an input of the white/achromatic detecting means and for controlling a gain of the gain control means in accordance therewith for enabling white adjustment;
   wherein the color separation means provides a red (R), blue (B) and luminance (Y) signal, and the color difference signal generating means provides a Y, R−Y, and B−Y signal; and
   wherein the abnormality detecting means includes means for supplying an output indicative of a color difference signal of R−B to an input of the white/achromatic detecting means for enabling control of an operating range of the white/achromatic detecting means in a first direction.

7. A white balance controller according to claim 5, wherein the abnormality detecting means includes means for supplying an output indicative of a color difference signal of R−B−2Y to an input of the white/achromatic detecting means for enabling control of the operation range in a second direction.

8. A white balance controller according to claim 7, wherein the gain control means includes a first gain control means for controlling the gain of the red signal and a second gain control means for controlling the gain of the blue signal.

9. A white balance controller according to claim 7, further comprising means responsive to the luminance signal for generating, in accordance with the luminance signal, a comparison-threshold value for determining whether a portion has high luminance and for changing the value according to one of an average luminance level and luminance distribution and for supplying an output thereof to the white/achromatic detecting means.

10. A white balance controller according to claim 7, wherein the white/achromatic detecting means includes first and second amplifier-comparator means receiving at one respective input thereof the color difference signal R−B and at another respective input thereof signals from first and second variable voltage source means, respectively, the first and second variable voltage source means varying the signal thereof in response to the output of the abnormality detecting means indicative of the color difference signal of R−B, third and fourth amplifier-comparator means receiving at one respective input thereof the color difference signal R+B−2Y and receiving at another respective input thereof signals from third and fourth variable voltage source means, respectively, the third and fourth variable voltage source means being responsive to the output of the abnormality detecting means indicative of the color difference signal of R+B−2Y for varying the signal thereof in accordance therewith, and a fifth amplifier-comparator means receiving at one input thereof the luminance signal and at another input a signal of a fifth voltage source means, an AND gate receiving outputs from the first, second, third, fourth and fifth amplifier-comparator means and providing an output to the abnormality detecting means.

11. A white balance controller according to claim 10, wherein the abnormality detecting means includes first gate means for receiving the color difference signal R−B and providing an output to a first integrator providing an output to a sixth amplifier-comparator means for providing the output indicative of the color difference signal R−B, and a second gate means for receiving the color difference signal R+B−2Y and providing an output to a second integrator means providing an output to a seventh amplifier-comparator means providing the output indicative of the color difference signal R+B−2Y, the output of the white/achromatic detecting means being supplied to the first and second gate means.

12. A white balance controller according to claim 11, further comprising white balance matrix means for receiving the outputs of the sixth and seventh amplifier comparator means and for controlling a gain of the gain control means in accordance therewith.

13. A white balance controller for an image pickup apparatus having image pickup means for providing an output indicative of an image, color separation means responsive to the output of the image pickup means for producing a luminance signal and a plurality of color signals therefrom, gain control means for controlling a gain of at least two color signals of the plurality of color signals separated by the color separation means, and means for generating color difference signals from at least one of a color signal and luminance signal, the white balance controller comprising:

means for detecting a white portion within a picked up image utilizing the luminance signal and for enabling acceptance of a portion within the picked up image having relatively high luminance as white; and means for generating, in accordance with the luminance signal, a comparison-threshold value for determining whether a portion has high luminance and for changing the value according to one of an average luminance level and luminance distribution, the generating means providing an output thereof to the detecting means.

14. A white balance controller for an image pickup apparatus having image pickup means for providing an output indicative of an image, color separation means responsive to the output of the image pickup means for producing a luminance signal and a plurality of color signals therefrom, gain control means for controlling a gain of at least two color signals of the plurality of color signals separated by the color separation means, and means for generating color difference signals from at least one of a color signal and luminance signal, the white balance controller comprising:

means for detecting a white portion within a picked up image utilizing the luminance signal and for enabling acceptance of a portion within the picked up image having relatively high luminance as white;

means for generating an average luminance level signal in accordance with the luminance signal as a comparison-threshold value for determining whether a portion has high luminance; and amplifier-controller means for receiving at one input the luminance signal and at another input the average luminance level signal from the generating means and for providing an output to the detecting means.

* * * * *